(12) United States Patent
Rolia et al.

(10) Patent No.: US 8,051,420 B2
(45) Date of Patent: Nov. 1, 2011

(54) METHOD AND SYSTEM FOR GOVERNING ACCESS TO COMPUTING UTILITIES

(75) Inventors: Jerry Rolia, Kanata (CA); Xiaoyun Zhu, San Jose, CA (US); Martin Arlitt, Calgary (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 1442 days.

(21) Appl. No.: 10/698,769

(22) Filed: Oct. 31, 2003

(65) Prior Publication Data

US 2005/0097560 A1    May 5, 2005

(51) Int. Cl.
*G06F 9/46* (2006.01)
(52) U.S. Cl. ........................................ 718/104
(58) Field of Classification Search .................... 718/104
See application file for complete search history.

(56) References Cited

U.S. PATENT DOCUMENTS

| | | | | |
|---|---|---|---|---|
| 5,845,201 A * | 12/1998 | Funke et al. | ................... | 455/403 |
| 5,933,417 A * | 8/1999 | Rottoo | ........................... | 370/260 |
| 6,144,727 A * | 11/2000 | Mashinsky | ............... | 379/114.02 |
| 6,363,434 B1 * | 3/2002 | Eytchison | ..................... | 719/313 |
| 6,647,448 B1 * | 11/2003 | Brelin | ........................... | 710/107 |
| 7,123,141 B2 * | 10/2006 | Contestabile | ............ | 340/539.13 |
| 7,334,228 B2 * | 2/2008 | Clohessy et al. | .............. | 718/104 |
| 2003/0056126 A1 * | 3/2003 | O'Connor et al. | ............ | 713/300 |
| 2004/0111509 A1 * | 6/2004 | Eilam et al. | ................... | 709/224 |
| 2005/0027864 A1 * | 2/2005 | Bozak et al. | ................... | 709/226 |

OTHER PUBLICATIONS

Chase, et al; "Managing Energy and Server Resources in Hosting Centers", Proceedings of the Eighteenth ACM Symposium on Operating Systems Principles (SOSP), Oct. 2001.
Foster, et al; "A Distributed Resource Management Architecture that Supports Advance Reservations and Co-Allocation", Intl Workshop on Quality of Service, 1999.
Rolia, et al; "Resource Access Management for a Resource Utility for Commercial Applications", submitted to IFIP/IEEE International Symposium on Integrated Network Management (IM), Mar. 2003.
Rolia, et al; "Statistical Service Assurances for Applications in Utility Grid Environments", The Proceedings of the 10th International Symposium on Modeling, Analysis, and Simulation of Computer and Telecommunications Systems (Mascots), Oct. 2002. Also appears as HP technical report HPL-2002-155.

* cited by examiner

*Primary Examiner* — Meng A An
*Assistant Examiner* — Mengyao Zhe

(57) ABSTRACT

A method and system for governing resources in a computing utility receives a demand profile associated with an application that identifies the resources required from a pool of resources during one or more demand cycles, admits an application to the computing utility facility if resources required for the application can be provided from the pool of resources in accordance with the demand profile and associated one or more demand cycles and assigns available resources from the pool of resources in response to a request from the application admitted to the computing utility facility.

22 Claims, 7 Drawing Sheets

Demand Profile A (Weekday) for Resource Pool X — 202

| Time Slot | Monday | Tuesday | Wednesday | Thursday | Friday |
|---|---|---|---|---|---|
| 8:00 | 88 | 88 | 89 | 90 | 26 |
| 9:00 | 88 | 91 | 94 | 93 | 27 |
| 10:00 | 13 | 14 | 18 | 14 | 25 |
| 11:00 | 16 | 15 | 16 | 93 | 33 |
| 12:00 | 14 | 16 | 17 | 11 | 43 |
| 1:00 | 15 | 12 | 13 | 14 | 65 |
| 2:00 | 89 | 89 | 89 | 90 | 45 |
| 3:00 | 87 | 87 | 87 | 56 | 23 |

Demand Profile B (Weekend) for Resource Pool X

| Hour | Saturday | Sunday |
|---|---|---|
| 8:00 | 12 | 12 |
| 9:00 | 14 | 14 |
| 10:00 | 13 | 14 |
| 11:00 | 17 | 17 |
| 12:00 | 14 | 16 |
| 1:00 | 13 | 16 |
| 2:00 | 15 | 16 |
| 3:00 | 20 | 145 |

— 204

Caveat Demand Profile for Resource Pool X — 206

| Hour | Event A Start Date | Event A End Date | Event B Start Date | Event B End Date | Event C Start Date | Event C End Date |
|---|---|---|---|---|---|---|
| 8:00 | 90 | 9 | 60 | 3 | 5 | 5 |
| 9:00 | 89 | 10 | 50 | 6 | 7 | 12 |
| 10:00 | 65 | 9 | 35 | 8 | 45 | 20 |
| 11:00 | 25 | 20 | 10 | 12 | 67 | 12 |
| 12:00 | 12 | 45 | 7 | 40 | 89 | 11 |
| 1:00 | 12 | 60 | 7 | 54 | 10 | 2 |
| 2:00 | 10 | 70 | 8 | 67 | 5 | 8 |
| 3:00 | 9 | 85 | 12 | 61 | 6 | 7 |

FIG. 2

METHOD AND SYSTEM FOR GOVERNING ACCESS TO COMPUTING UTILITIES

BACKGROUND OF THE INVENTION

The present invention relates to utility computing. In a utility computing environment, utilization is improved by increasing the availability of servers and other computing resources to more people and their applications. Instead of sitting idle for a single application, these resources are used to execute programs for many users. Information technology infrastructure costs are reduced as computer resources are not purchased to only solve a single complex task for a department or division in a company. Instead utility computing allows the computer resources to be used by many different people during both peak periods and periods otherwise considered off-peak. Properly implemented, utility computing reduces the need for more resources as existing resources can be shared.

Utilization efficiency in the utility computing facility depends to a large extent on governing access to the pools of resources associated with the utility computing facility. It also depends on the ability of the system to accommodate the application demand and usage requirements in the future. Unfortunately, existing conventional systems have not been able to properly monitor or anticipate access to these pools of resources and deal with the relatively complex demand patterns that may be present in an enterprise or organization.

A number of conventional solutions only assure users and applications that a "best effort" will be made to allocate certain computing resources. The best effort approach does not allow for higher assurances if the customers are interested in higher availability of resources.

Other solutions allow customers to make monetary bids on computing utilities thereby indicating a desired quality of service or service assurance when using the resources. These systems are often driven by service level agreements or SLAs with higher paying customers receiving higher levels of service and resources. It remains unclear, however, what quality of service customers entering lower monetary bids are provided given the focus on this higher paying customer base.

Yet other utility computing solutions gauge access to pools of resources based upon transaction response times for different applications. The systems managing resources in this manner are complicated. They tie quality of service to the responsiveness of a particular application rather than the overall responsiveness of resources in the computing utility.

As companies cut costs in information technology budgets, there is parallel demand to improve the information technology infrastructure for people to work more efficiently. Large server farms and clusters of computers can be used to improve the utilization of computing resources in an enterprise or company if utility computing is deployed effectively. Indeed, for infrequently run applications, the conventional utility computing environments previously described may seem useful as they operate on a very predictable schedule.

Unfortunately, implementing utility computing for business applications that are critical to the operation of a company is a much more difficult task. These business applications are generally very different in nature and have non-uniform computing needs. If a computing utility is unable to provide the necessary resources, business processes may not be performed resulting not only in delayed productivity but reduced business transactions and lost revenue. Improved controls for computing utility environments are needed to run business and engineering applications with less scheduling and even higher level of assurances.

BRIEF DESCRIPTION OF THE DRAWINGS

FIG. 2 is a set of demand profile tables designed in accordance with one implementation of the present invention;

Like reference numbers and designations in the various drawings indicate like elements.

SUMMARY OF THE INVENTION

Figure 1:
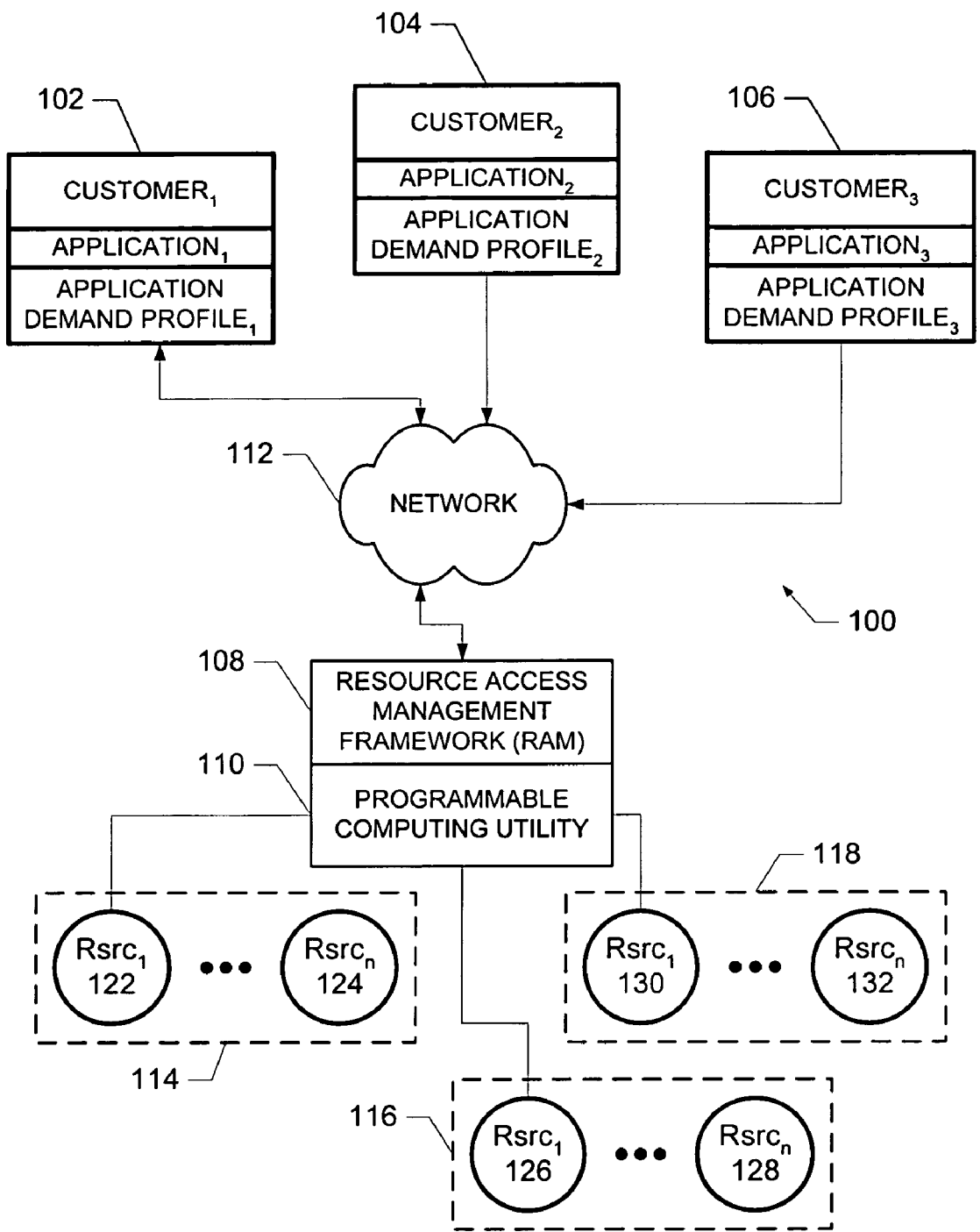
FIG. 1 is a block diagram overview of a system for governing access to resources in a computing utility facility in accordance with one implementation of the present invention.

One aspect of the present invention features a method of governing access to resources in a computing utility facility. Access is governed by receiving a demand profile associated with an application that identifies the resources required from a pool of resources during one or more demand cycles. An application is admitted to the computing utility facility if resources required for the application can be provided from the pool of resources in accordance with the demand profile and associated one or more demand cycles. Available resources are assigned from the pool of resources in response to a request from the application admitted to the computing utility facility.

DETAILED DESCRIPTION

Aspects of the present invention are advantageous in at least one or more of the following ways. Resources in a computing facility can be allocated to a number of continuously running applications. A demand profile associated with each application describes one or more cycles of demand for resources required from the computing facility. These demand profiles are aggregated by implementations of the present invention statistically to reduce the probability that one or more pools of resources available in the computing facility will be overbooked. In the ever resources are overbooked, demand profiles are used to better manage the occurrence.

This framework for governing resources allows more accurate service assurances to be made by associating resources using statistical models that reduce overbooking and system congestion. These statistical models can be combined with more conventional computing facility management schemes based on economic models and priorities to also facilitate commercial deployment and monetization of resources. Overall, this makes the framework for governing resources more predictable and therefore valuable as a computing facility for business applications and a commercial context.

The accuracy provided by this framework also translates to higher asset utilization for running business applications and other continuously running programs. The hardware and software assets in the computing facility can be run with smaller margins of error as the scheduling of resources is more controlled and therefore more predictable. Careful analysis of the demand profile for an application in advance provides greater insight to the demands on the computing facility in the future and reduces the need for over building hardware and software assets in the computer facility to manage sudden spikes in resource demands and utilization. In addition to reducing asset investment costs, operational costs are reduced as more automation is possible and operator intervention is reduced.

Further, a poly-cyclic specification of resource demands provides a compact yet complete method of specifying demand cycles for each application. Applications can provide the framework of the present invention with multiple cycles to describe the projected demand for resources by the application. Each cycle describes a repeating demand cycle for resources that may be statistical in nature or predetermined according to other extrinsic information. These more frequently repeating cycles can be punctuated by caveat based cycles that take care of one-time occurrences or events that occur on much longer cycles. Together, the caveat demand cycles and the more regular demand cycles provided in the demand profile describe resource requirements more completely and satisfy the degree of assurance required for commercial and business applications.

FIG. 1 is a block diagram overview of a system for governing access to resources in a computing utility facility in accordance with one implementation of the present invention. System 100 includes a series of customers 102, 104 and 106 each having an application and an application demand profile. Alternate implementations of the present invention can readily be scaled to accommodate customers having multiple applications and corresponding multiple demand profiles.

In this particular implementation, customers 102, 104 and 106 in system 100 communicate over network 112 to a resource access management (RAM) framework 108, a programmable computing utility 110 and resource pools 114, 116, and 118. Alternatively, customers 102, 104 and 106 can communicate directly to other portions of system 100 rather than over network 112.

Resource pools 114, 116 and 118 include a range of resources including resource 122 to resource 124, resource 126 to resource 128 and resource 130 to resource 132 respectively. Each range of resources may include one or more different resources arranged in different organizational schemes as appropriate for the particular customers/applications being served and as required logistically by the system setup. For example, resources can be pooled according to the type of resource (i.e., pools of storage devices, pools of processors, pools of graphics rendering processors or pools of network nodes), the quality of the resources, (i.e., pools of high-availability devices and pools of medium reliability devices or low-cost devices) or any other logical method of grouping the resources.

Customers 102, 104 and 106 submit application demand profiles along with their applications to resource access management framework 108. The demand profile associated with each application describes the demand for certain resources in one or more pools of resources as a series of cycles or as a poly-cyclic representation of demand over time. Consequently, accurately predicting overall demand for resources by the various applications depends on the accuracy of each of the demand profiles and demand cycles provided by each application.

Resource access management framework 108 qualifies and admits certain applications in accordance with implementations of the present invention before the applications are able to make requests for resources and begin processing data, run business applications or otherwise utilize any of the resources associated with programmable computing utility 110. Once admitted, resource access management framework 108 continues to police admitted applications to ensure they do not attempt to over utilize resources, impact other admitted applications or otherwise operate outside their submitted demand profiles. Meanwhile, programmable computing utility 110 is responsible for ensuring the processing of data and accessing storage on behalf of the individual applications once they have been admitted and entitled to the actual resources.

FIG. 2 is a set of demand profile tables designed in accordance with one implementation of the present invention. These example demand profiles tables include a demand profile A 202, a demand profile B 204 and a caveat demand profile 206 for a resource in pool of resources "X". Each table in this example contributes a different cycle of demand forming a poly-cyclic demand for a resource by the application. While other resources may be used by the application they are omitted for brevity and clarity of this example. Accordingly, additional resources would be specified in different demand tables corresponding to other resources and pools of resources. Alternate implementations can organize the demand profiles and tables of the present invention in many different ways including multi-dimensional data structures and objects having a hierarchical organization using inheritancy and other object-oriented features. They also may include different notations and granularities for referencing schedules. For example, a 24-hour notation could be used specifying all hours of the day rather than the conventional time indicated to avoid ambiguities between A.M. and P.M. hours. In addition to example values illustrated in FIG. 2, alternate implementations may use scalar values, values representing distributions or values representing data that contributes to such distributions. Further the illustrated demand profiles separate weekdays form weekends however, alternate schemes for organizing calendar dates can also be adopted that organize dates according to days, weeks, months, years or any other divisions that satisfy the particular needs of the implementation.

As previously mentioned, the complete demand profile for an application is composed of many smaller individual cycles and form a poly-cyclic pattern of demand. In the present example in FIG. 2, demand profile A 202 represents the cycle of demand during weekdays by a particular application for a particular resource pool X. The demand in this example is divided into 1-hour time slots and assumed to be statistically identical throughout each 1 hour time slot. For example, demand profile A 202 indicates that the demand for a resource pool X by the application is higher in the morning (i.e., 8:00 am to 9:00 am) and the later afternoon (i.e., 2:00 pm to 3:00 pm) Monday through Thursday. According to demand profile A 202, the demand profile for this resource on a Friday is different from the demand profile for the same resource during the other days of the week. Demand profile A 202 also records uncharacteristic spikes in demand that may arise as noted on Thursday at 11:00 am where the demand index rises to "93" rather than 15 or 16 as on preceding days. Though 1-hour slots are used to simplify this example, alternate implemenatations of the present invention may use different size time slots or variable time slots of any equal or unequal durations.

Demand profile B 204 is a different table representing the demand for the resources by the same application on weekends rather than during the week. Consequently, to determine the overall demand from the application, demand profile A 202 (weekday) is combined with demand profile 204 (weekend) forming the poly-cyclic demand for the resource. Alternate implementations could combine more than two different cycles to create more refined and complex poly-cyclic demand patterns.

An additional caveat demand profile 206 can also be added to the poly-cyclic demand to represent events that occur more infrequently or over longer periods of times. Events entered in caveat demand profile 206 may include special events, holidays, seasonal occurrences and even emergencies that happen to have an element of predictability. For example, caveat demand profile 206 in FIG. 2 has three entries for three potentially different caveat type events. In this example, events A, B, and C have a start date and an end date with an associated demand level for several hours during this time period. If the start date and end date cover only two days then the demand levels entered in caveat demand profile 206 are used on the start date and end date respectively. When more than two days are covered, the demand levels associated with the start date and end date are used to approximate a demand curve for the time period between the dates bounding the time interval.

Alternate implementations can organize caveat demand profile 206 in many other ways and may or may not use start and end dates as illustrated in FIG. 2. For example, events in a caveat demand profile can be specified according to a pattern of dates. This pattern could include specifying particular calendar dates such as, "the last two business days of the month" or "the first Thursday in November." In any event, the time slots and demand values in caveat demand profile 206 are also combined with demand profile A 202 and demand profile B 204 to create a resulting overall poly-cyclic demand to represent demand for the various resources in the computing facility. Further, caveat demand profile 206 may even hold pointers to replacement demand profiles to be used from the specified start date to end date in lieu of actual profile data.

Figure 3:
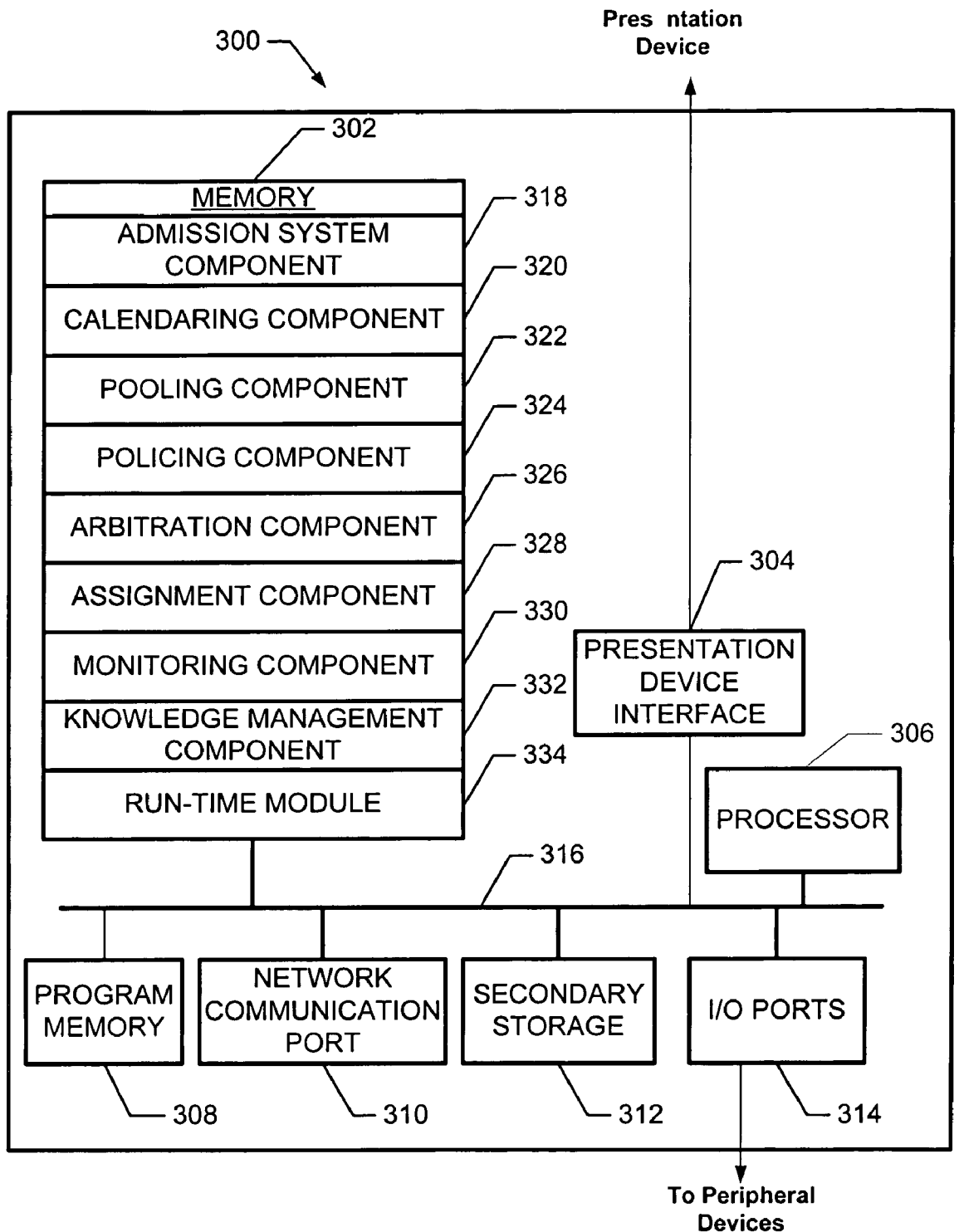
FIG. 3 is a block diagram of a system used in one implementation for performing the apparatus or methods of the present invention.

FIG. 3 is a block diagram of a system 300 used in one implementation for performing the apparatus or methods of the present invention. System 300 includes a memory 302 to hold executing programs (typically random access memory (RAM) or read-only memory (ROM) such as a flash ROM), a presentation device interface 304 capable of interfacing and driving a display or output device, a processor 306, a program memory 308 for holding drivers or other frequently used programs, a network communication port 310 for data communication, a secondary storage 312 with a secondary storage controller and input/output (I/O) ports and controller 314 operatively coupled together over a bus 316. System 300 can be preprogrammed, in ROM, for example, using field-programmable gate array (FPGA) technology or it can be programmed (and reprogrammed) by loading a program from another source (for example, from a floppy disk, a CD-ROM, or another computer). Also, system 300 can be implemented using customized application specific integrated circuits (ASICs).

In one implementation, memory 302 includes a admission system component 318, a calendaring component 320, a pooling component 322, a policing component 324, an arbitration component 326, an assignment component 328, a monitoring component 330, a knowledge management component 332 and a run-time module 334 that manages system resources used when processing one or more of the above components on system 300.

As illustrated, these various modules of the present invention appear in a single computer system. However, alternate implementations could also distribute these components in one or more different computers to accommodate for processing demand, scalability, high-availability and other design constraints. Similarly, components illustrated in FIG. 3 that appear to be discrete and separate from each other. An alternate implementation could combine one or more of these components to effectuate higher efficiencies, lower costs or any other design constraint needed to implement aspects of the present invention in a large-scale enterprise or small-scale operating environment. For example, calendaring component 320 and admission component 318 are illustrated as discrete components however it may be more advantageous to combine these components if doing so would increase performance and scalability of the overall system implementation.

Admission system component 318 is responsible for determining if a customer and a given application can be granted admission to use the computing utility facility based on a provided demand profile. Admission system component 318 analyzes both the typical cyclical portions of an application demand profile as well as the caveat driven portions of the demand cycle when making a determination whether to admit or not admit a particular application to the computing utility facility. Details on one implementation of these operations are described in further detail later herein.

Calendaring component 320 maintains one or more calendars used in determining available resources and admitting or not admitting additional applications to the computing utility facility. In one implementation, calendars include time slots corresponding to each hour of usage each day of the week for several years at a time. Alternatively, calendars can track seconds, minutes, weeks, months, or years depending on the granularity required and application requirements. Entries are made on a staging calendar until the application entries are admitted to the computing utility facility and then added to a permanent calendar upon admission. To compartmentalize this information, the staging calendar and permanent calendar can be logically different calendars or alternatively can be the same calendar with a status flag indicating that certain entries in the calendar are tentative or staged while other entries in the calendar are permanent entries. Alternate implementations can arrange tentative and permanent entries in calendaring component 320 in many other ways other than those described above.

Pooling component 322 is a component used to organize and present the various resources available to system 300 as one or more resource pools. The resources pooled together may include storage, computing resources, network bandwidth and any other resource being requested by customers running applications. As previously described, these resources can be pooled together based on the type of resource (i.e., pools of storage devices, pools of processors, pools of graphics rendering processors or pools of network nodes), the quality of the resources, (i.e., pools of high-availability devices and medium reliability devices or low-cost devices) or any other logical or physical method of grouping the resources.

Once an application is admitted, policing component 324 ensures subsequent requests for resources from the admitted applications are within an acceptable range according to the application's associated demand profile. Policing component 324 intercepts and rejects requests for resources made outside the acceptable range thus reducing the likelihood that certain resources will become overbooked and/or unavailable.

Arbitration component 326 intervenes when more than one application is entitled to a limited resource associated with the computing utility facility. To resolve conflict between applications, arbitration component 326 may implement one or more different operations to resolve the contention for the limited resource. In general, arbitration may be necessary if admission component 318 admits an application that overbooks one or more resource pool and policing component 324 does not catch a request resulting in contention for resources associated with the computing utility facility.

Once a resource is granted, assignment component 328 performs the necessary tasks and operations to assign the resources from the computing utility facility to a particular application. Assignment component 328 can perform the assignments under one or more different policies. For example, assignment component 328 can assign a first available resource to an application; assign a resource to an application that minimizes the latency for using a particular resource or resources with the application; or defer to a separate assignment module that performs the assignment using a different or proprietary approach to assigning resources.

Monitoring component 330 creates an audit trail associated with requests to acquire and/or release resources from resource pools and the overall computing utility facility. Detailed data gathering operations programmed into monitoring component 330 creates an audit trail with emphasis on facts related to operation of the application in conjunction with a requested resource. For example, monitoring component 330 can specify inclusion of variable length descriptive information, failure cause information and other information useful in analyzing resource distribution and utilization and other interactions with the system.

Knowledge management component 332 is an overall analysis module that exploits information from other systems like system 300 as well as results from monitoring component 330. The services provided by knowledge management component 332 include access control to data elements in system 300 and security implementations for system 300. For example, the services provided by knowledge management component 330 include: categorizing applications into different workload classes, maintaining different application profiles automatically, anticipating future application demands for resources in a computing utility facility, and projecting failure rates for certain resources and providing capacity planning scenarios for the operator of the computing utility facility.

Figure 4:
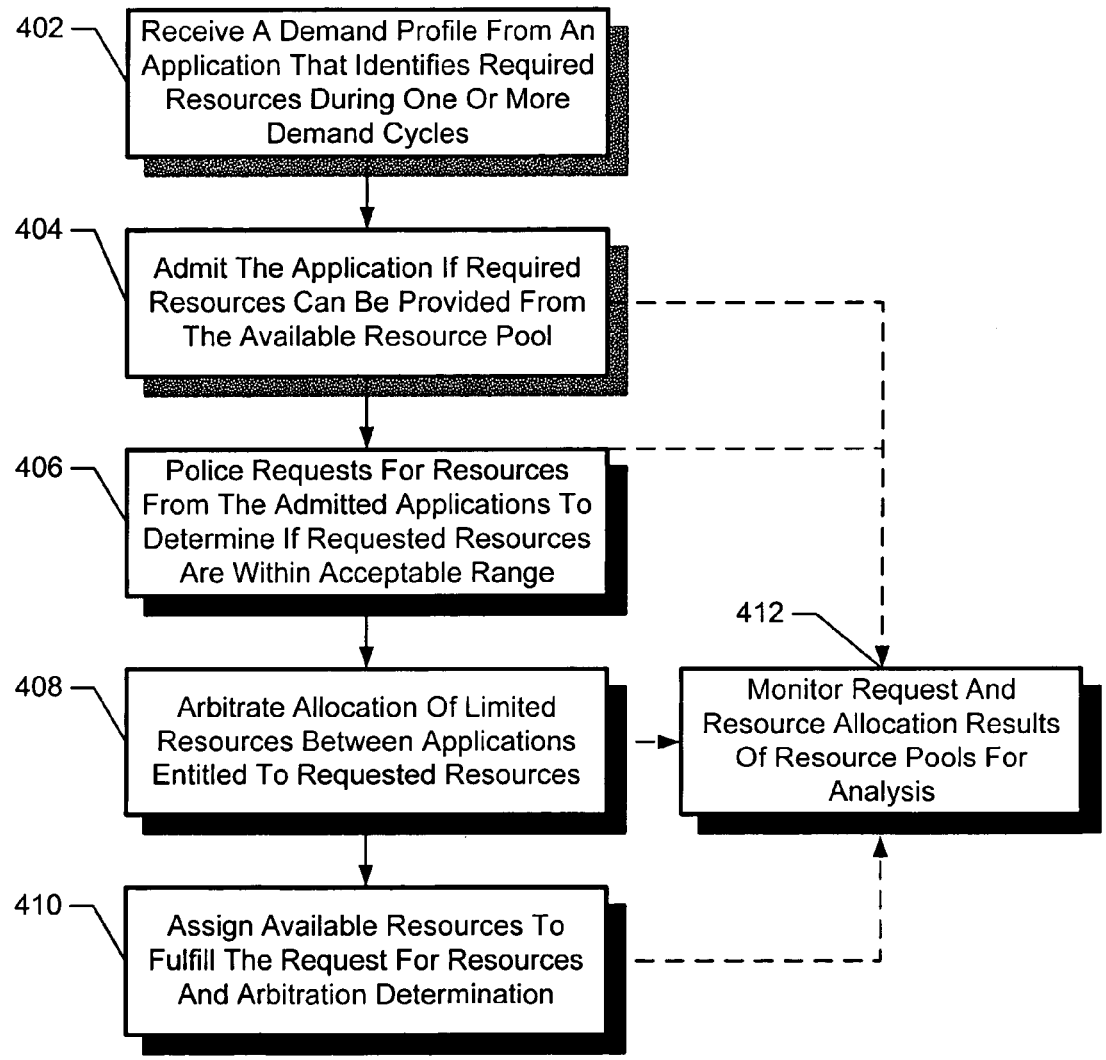
FIG. 4 is a flowchart diagram providing the operations for governing access to resources in a computer utility facility in accordance with one implementation of the present invention.

FIG. 4 is a flowchart diagram providing the operations for governing access to resources in a computer utility facility in accordance with one implementation of the present invention. Initially, a customer submits a demand profile associated with an application that identifies the resources required during one or more demand cycles (402). As previously described, implementations of the present invention use the demand profiles to create a poly-cyclic demand for resources, manage any overbooking of resources and ensure the availability of resources. These demand profiles can be created empirically through data collection or through various statistical estimation methodologies. For example, the demand profile for one application can include many smaller demand profiles corresponding to different time periods or other cycles of operation used by the application. Because business applications are often run continuously, there may be one demand cycle associated with demand during the week and another demand cycle associated with demand by the application on weekends or other period when the activity is reduced or lessened.

Alternatively, if cyclic profiles are not known in advance, an application may request resources and allow implementations of the present invention to identify the appropriate demand cycles. For example, monitoring and knowledge management components can be used to learn and report on these demand cycles for use in demand profiles generated for subsequent resource reservation requests.

Once the demand profiles are provided, implementations of the present invention then admit the application if required resources can be provided from an available resource pool (404). The admission process involves comparing the one or more time demand cycles making up the poly-cyclic demand for a resource with the availability of the resource. Statistical analysis is used to project this information and determine if admitting the application and fulfilling the projected corresponding demand is feasible in light of demand profiles from the other already admitted applications.

To further manage overbooking, implementations of the present invention may also police requests for resources from the admitted applications to determine if requested resources are within an acceptable range (406). Before admission, applications provide a demand profile based upon an expected usage of one or more resources while executing an application over a period of time. While running business applications and other applications continuously or for long periods of times, it is possible that an application may attempt to exceed the boundaries of the demand profile initially provided to gain admission to the computing utility facility. Accordingly, policing individual requests from applications as the applications run continuously reduces the chance of overbooking and violation of a service level assurance (SLA). Details on policing operations are described later herein.

Despite these attempts to avoid a conflict for resources, occasionally it may be necessary to arbitrate which applications are entitled to a requested but limited resource (408). Arbitration implemented in accordance with the present invention may be required to provide the resource to one application and deny the resource to other contending applications; details on this process are also provided later herein. Once an application's request is chosen to be fulfilled, implementations of the present invention assign the available resource to fulfill the request (410). The resource is released from the application once the request is fulfilled and can be reassigned at a later point in time.

Figure 5:
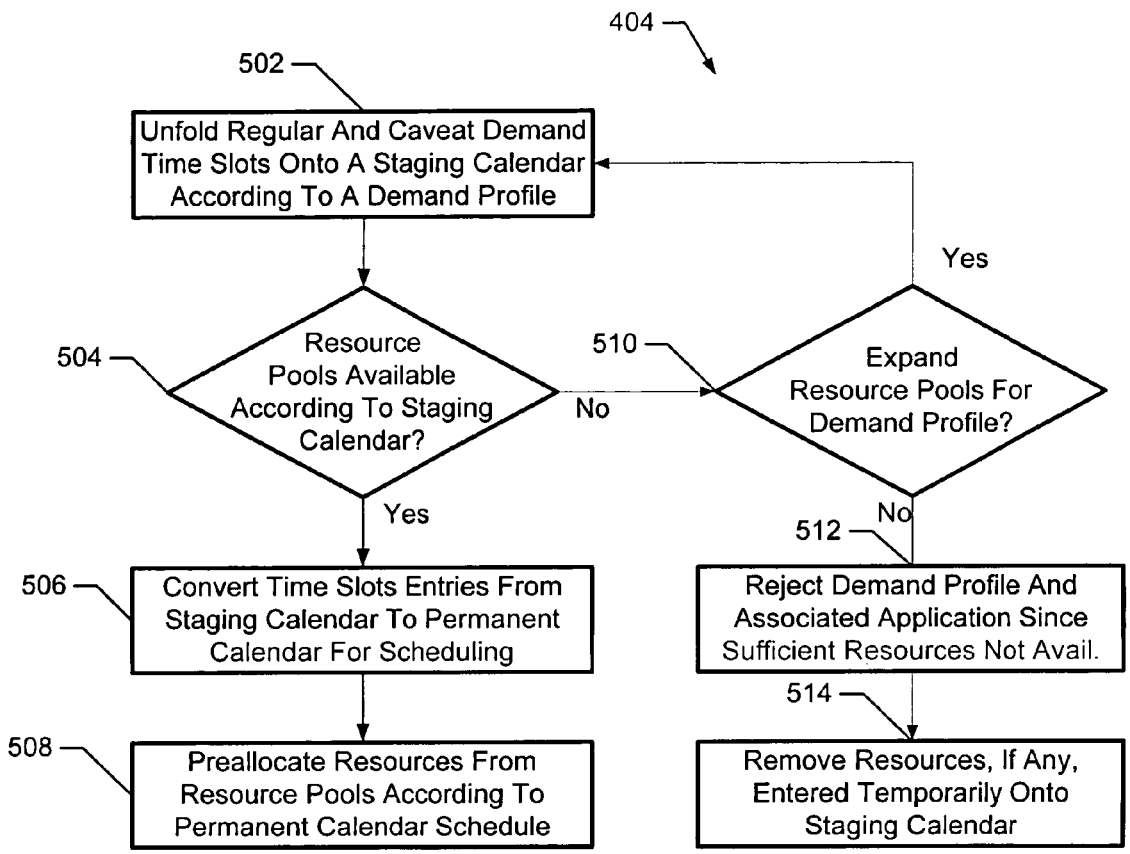
FIG. 5 is a flowchart diagram of the operations for combining multiple demand profiles representing the poly-cyclic behavior of an application.

Together the results from the admission, policing, arbitration and other operations are monitored and the result kept for later analysis (412). The audit trail developed during the monitoring stages assists in understanding the allocation of resources, the request and release of certain resources along with the outcome of each request for resources. For example, the monitoring can track if an application requesting a resource becomes entitled to the resource or is rejected; further monitoring can also reveal details on the resource selected and assigned to an application. These results can be passed directly to the knowledge management component of the present invention or archived for subsequent FIG. 5 is a flowchart diagram of the operations for combining multiple demand profiles to represent the poly-cyclic behavior of an application. This flowchart diagram in FIG. 5 further describes step 404 from FIG. 4. Initially, implementations of the present invention unfold regular and caveat demand time slots from the submitted demand profiles onto a staging calendar (502). Regular time slots generally reoccur on a relatively short time frame while caveat demand time slots occur over much longer periods of times. For example, one set of demand time slots used by an application may repeat during the week while another set of demand time slots occur with a certain demand on the weekends. Occasional events including sporting events or certain holidays can be predicted by entering a demand for resources using the caveat demand time slot. Each type of demand occurs at a particular cycle creating the poly-cyclic behavior associated with the application.

Both the regular and caveat time slots are unfolded and placed on a staging calendar to determine the ability of the computing utility facility to provide the required resources for the application (504). Resource pools associated with the computing utility facility are probed to determine if the request made by an application can be fulfilled.

If the resources are available, implementations of the present invention convert time slot entries from staging calendar to the permanent calendar for scheduling (506). This conversion can be done by keeping separate staging and permanent calendars or merely changing the status of a time slot entry from being staged or temporary to permanent when the scheduling is complete. Optionally, the present invention can then preallocate resources from the resource pools according to entries in the permanent calendar schedule (508). This latter step would additionally make sure the resources do not appear available to other applications subsequently.

Alternatively, if the resources in the resource pools are not available then it may be possible to accommodate the demand profile by expanding the resource pools to include additional resources (510). Once the additional resources are added to the pool then the demand profile is compared again to available resources (502). When no additional resources can be added, implementations of the present invention reject the demand profile and associated application (512) and then remove requested resources, if any, entered temporarily onto the staging calendar from the demand profile (514) in preparation for subsequent operations.

Figure 6:
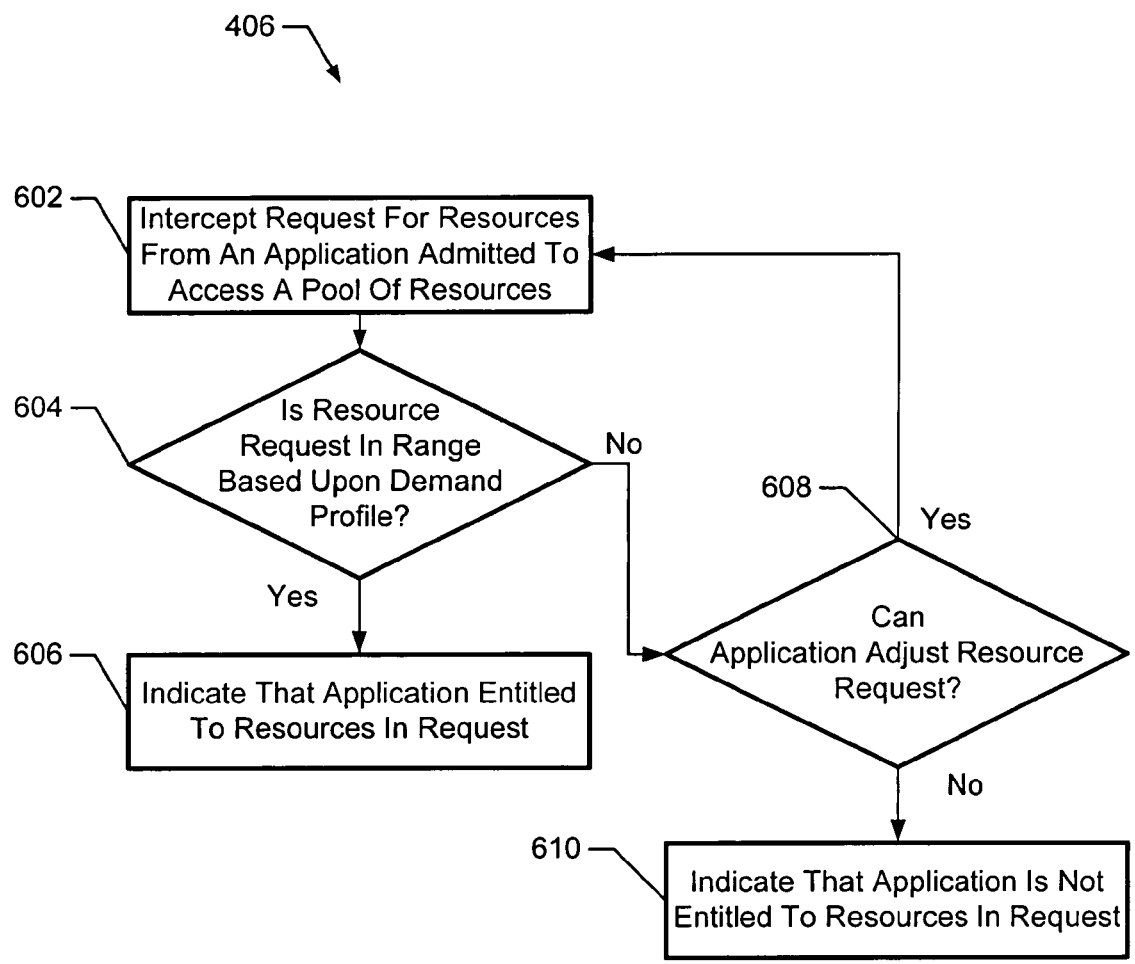
FIG. 6 is a flowchart diagram of the operations used to police requests for resources from admitted applications in one implementation of the present invention.

FIG. 6 is a flowchart diagram detailing the operations used to police requests 406 for resources from admitted applications in one implementation of the present invention. Initially, the policing intercepts all requests for resources from applications admitted to access a pool of resources (602). The policing operations check that a resource request is within a tolerable range considering the demand profile for the application (604). If the application request for a resource is within the tolerable range then an indication is provided that application is entitled to the requested resources (606).

Alternatively, in the event the request is outside of the demand profile, a request is made to the application to adjust the request for resources (608) and try once again. Implementations of the present invention provide an indication to applications unable to adjust their request for resources that they are not entitled to the requested resources (610).

Figure 7:
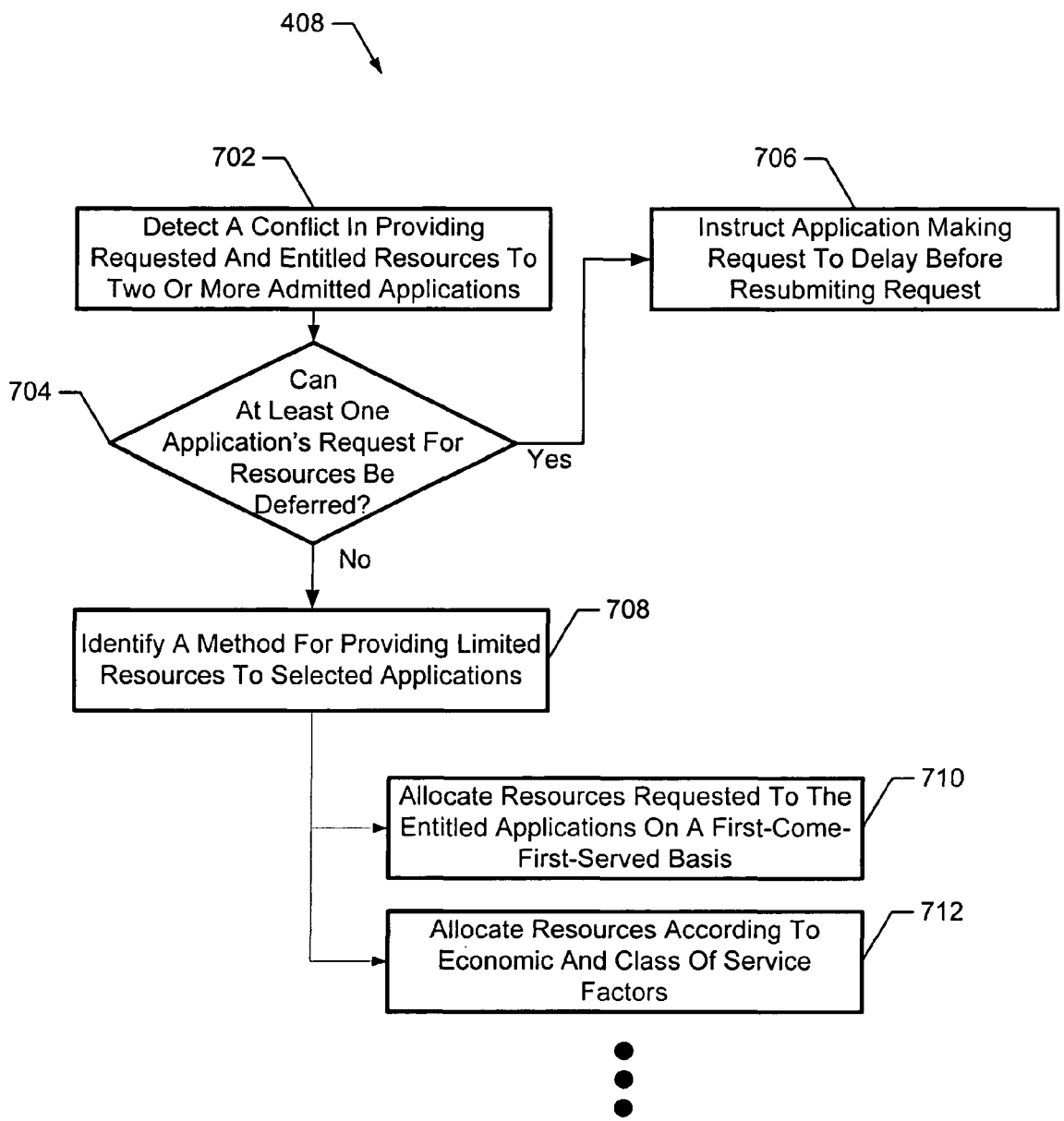
FIG. 7 is another flowchart diagram of the operations for arbitration of resources in accordance with one implementation of the present invention.

FIG. 7 is flowchart diagram detailing the operations for arbitration of resources 408 in accordance with one implementation of the present invention. In some cases, applications admitted to use the computing utility facility may have contention for one or more of the same resources. In one implementation, the present invention detects a conflict in providing requested resources to two or more admitted applications even though they are entitled to the resources (702). Each of the applications is entitled to the resources as they have made a request within their respective demand profile. However, the requested resource is in limited supply and cannot be assigned to both applications causing a conflict or contention.

To resolve this dilemma, one implementation of the present invention determines if at least one application's request for resources can be deferred until a later time (704). An application making the request is instructed to delay before resubmitting a request for the resources thereby allowing another application to receive the resource requested (706).

If no application can readily defer the request for resources, an alternative solution identifies a method for providing the limited resources to only selected applications (708). In one implementation, the resources requested and in contention are allocated to the entitled applications on a first-come-first-served basis (710). Yet another implementation allocates resources according to economic and class of service factors (712) or some other function call that performs a similar type of analysis on economic or service type factors and makes an allocation determination. Many other operations for selecting one of the applications to receive contended resources are contemplated. In each scenario, one or more applications receive the requested resource while other applications are not able to immediately receive their requested resource.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

While specific embodiments have been described herein for purposes of illustration, various modifications may be made without departing from the spirit and scope of the invention. For example, tables are provided describing one or more demand cycles for a particular resource or pool of resources however the values in these tables are only examples and the organization and scope of information is intentionally limited to illustrate the example. In practice, demand information and corresponding resources could be contained in many tables or databases and may include many details about the resources, the demand cycles and other demand details. Accordingly, the invention is not limited to the above-described implementations, but instead is defined by the appended claims in light of their full scope of equivalents.

What is claimed is:

1. A method of governing access to resources in a computing utility facility, comprising:

providing a processor for receiving a demand profile associated with an application that identifies the resources required from a pool of resources in the computing utility facility during one or more demand cycles;

admitting an application to the computing utility facility if resources required for the application can be provided from the pool of resources in accordance with the demand profile and associated one or more demand cycles; and assigning available resources from the pool of resources in response to a request from the applications admitted to the computing utility facility;

wherein admitting the application further comprises unfolding the one or more demand cycles from the demand profile associated with the application into time slots requiring resources from the pool of resources, wherein the amount of resources required from the pool of resources by the application varies across each of the time slots such that assignment of resources is tailored to varying demand across each of the time slots;

wherein admitting the application further comprises:

comparing the time slots requiring resources with a staging calendar of time slots representing availability of resources in the pool of resources; and converting time slots from the staging calendar to a permanent calendar when comparison indicates the time slots requiring resources from the demand profile are available for assignment; and wherein unfolding the one or more demand cycles includes a caveat time cycle based upon an event that occurs over a long-period of time and is selected from a set including special events, holidays, seasonal occurrences and emergencies.

2. The method of claim 1 wherein the caveat time cycle is based upon knowing when at least one particular event is going to occur in the future.

3. The method of claim 1 wherein unfolding the one or more demand cycles includes a demand cycle describing a demand for resources from a resource pool during weekdays and another demand cycle describing another demand for resources during weekends.

4. The method of claim 1 wherein converting time slots from the staging calendar to a permanent calendar comprises:
copying the time slots from the staging calendar to the permanent calendar; and
preallocating the requested resources from the pool of resources according to the permanent calendar schedule.

5. The method of claim 1 wherein converting time slots from the staging calendar to a permanent calendar comprises:
indicating the time slots in the staging calendar associated with the requested resources are permanent and not for staging purposes; and
pre-allocating the requested resources from the pool of resources according to the permanent calendar schedule.

6. The method of claim 1 further comprising:
policing requests for resources from the admitted applications to determine if the resources being requested are within an acceptable range.

7. The method of claim 6 further comprising:
intercepting a request for resources from an application admitted to access a pool of resources;
determining if resource request is within an acceptable range of demands based upon the demand profile of the application;
indicating an application is not entitled to the request when the determination indicates the request is outside the acceptable range of demands; and
indicating an application is entitled to the request when the determination indicates an application is within the acceptable range of demands.

8. The method of claim 1 further comprising arbitrating the allocation of limited resources between two or more applications entitled to receive the requested resources.

9. The method of claim 8 wherein the arbitration comprises:
detecting a conflict in providing requested resources to two or more admitted applications entitled to receive the requested resources;
determining if at least one application can forego receiving the requested resources causing the conflict for a predetermined period of time;
instructing the at least one application to forego receipt of the requested resources for a period of time in accordance with the determination;
allocating resources to the remaining admitted applications entitled to receive the requested resources in accordance with a priority scheme.

10. The method of claim 9 wherein the priority scheme includes selecting admitted applications to receive the requested resources on a first-come-first-serve basis.

11. The method of claim 9 wherein the priority scheme includes selecting admitted applications to receive the requested resources in according to economic and class of services factors.

12. An apparatus for governing access to resources in a computing utility facility, comprising:
a processor capable of executing instructions;
a memory containing instructions when executed cause the processor to receive a demand profile associated with an application that identifies the resources required from a pool of resources in the computing utility facility during one or more demand cycles, admit an application to the computing utility facility if resources required for the application can be provided from the pool of resources in accordance with the demand profile and associated one or more demand cycles; and assign available resources from the pool of resources in response to a request from the applications admitted to the computing utility facility; and
wherein the demand profile associated with an application is created through data collection or statistical estimation;
wherein the instructions that admit the application further comprises instructions that unfold the one or more demand cycles from the demand profile associated with the application into time slots requiring resources from the pool of resources;
wherein the resources required from the pool of resources varies across each of the time slots such that assignment of resources is tailored to varying demand across each of the time slots;
wherein the instructions that admit the application further comprises instructions that:
compare the time slots requiring resources with a staging calendar of time slots representing availability of resources in the pool of resources and convert time slots from the staging calendar to a permanent calendar when comparison indicates the time slots requiring resources from the demand profile are available for assignment; and
wherein the instructions that unfold the one or more demand cycles also includes in the one or more demand cycles a caveat time cycle based upon an event that occurs over a long-period of time and is selected from a set including special events, holidays, seasonal occurrences and emergencies.

13. The apparatus of claim 12 wherein the caveat time cycle processed by the instructions is based upon knowing when at least one particular event is going to occur in the future.

14. The apparatus of claim 12 wherein the instructions that unfold the one or more demand cycles includes a demand cycle describing a demand for resources from a resource pool during weekdays and another demand cycle describing another demand for resources during weekends.

15. The apparatus of claim 12 wherein the instructions that convert time slots from the staging calendar to a permanent calendar further comprises instructions that:
copy the time slots from the staging calendar to the permanent calendar and preallocate the requested resources from the pool of resources according to the permanent calendar schedule.

16. The apparatus of claim 12 wherein the instructions that convert time slots from the staging calendar to a permanent calendar further comprises instructions that:
indicate the time slots in the staging calendar associated with the requested resources are permanent and not for staging purposes and preallocate the requested resources from the pool of resources according to the permanent calendar schedule.

17. The apparatus of claim 12 further comprising instructions that:
police requests for resources from the admitted applications to determine if the resources being requested are within an acceptable range.

18. The apparatus of claim 17 further comprising instructions that:
intercept a request for resources from an application admitted to access a pool of resources, determine if the resource request is within an acceptable range of demands based upon the demand profile provided by the application, indicate that an application is not entitled to the request when the determination indicates the request is outside the acceptable range of demands and indicate that an application is entitled to the request when the determination indicates an application is within the acceptable range of demands.

19. The apparatus of claim 12 further comprising instructions that:
arbitrate an allocation of limited resources between two or more applications entitled to receive the requested resources.

20. The apparatus of claim 19 wherein the instructions that arbitrate further comprises instructions that:
detect a conflict in providing requested resources to two or more admitted applications entitled to receive the requested resources, determine if at least one application can forego receiving the requested resources causing the conflict for a predetermined period of time, instruct the at least one application to forego receipt of the requested resources for a period of time in accordance with the determination, and allocate the resources to the remaining admitted applications entitled to receive the requested resources in accordance with a priority scheme.

21. The apparatus of claim 20 wherein the instructions implementing the priority scheme further comprises instructions that select admitted applications to receive the requested resources on a first-come-first-serve basis.

22. The apparatus of claim 20 wherein the instructions implementing the priority scheme further comprises instructions that select admitted applications to receive the requested resources in according to economic and class of services factors.

* * * * *